Figure 1:
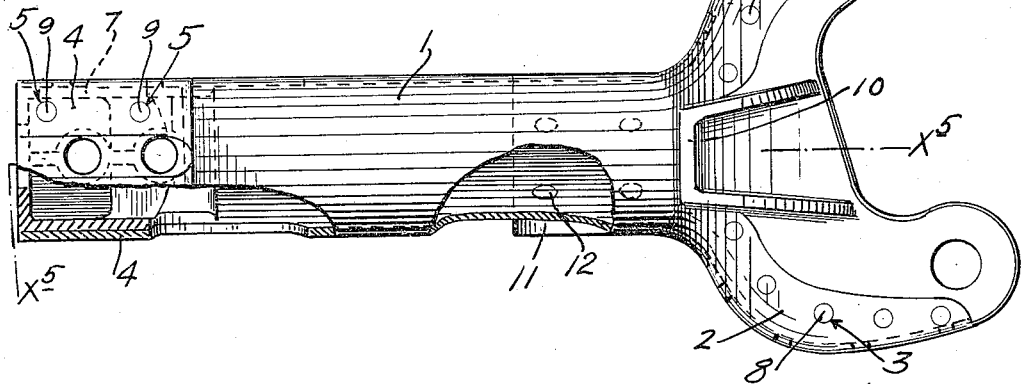

A. C. McCORD.
COUPLING DRAW BAR.
APPLICATION FILED MAR. 5, 1915.

1,165,190.

Patented Dec. 21, 1915.
3 SHEETS—SHEET 1.

Witnesses
E. C. Skinkle
A. H. Opsahl

Inventor
A. C. McCord
BY HIS ATTORNEYS
Williamson & Muchard

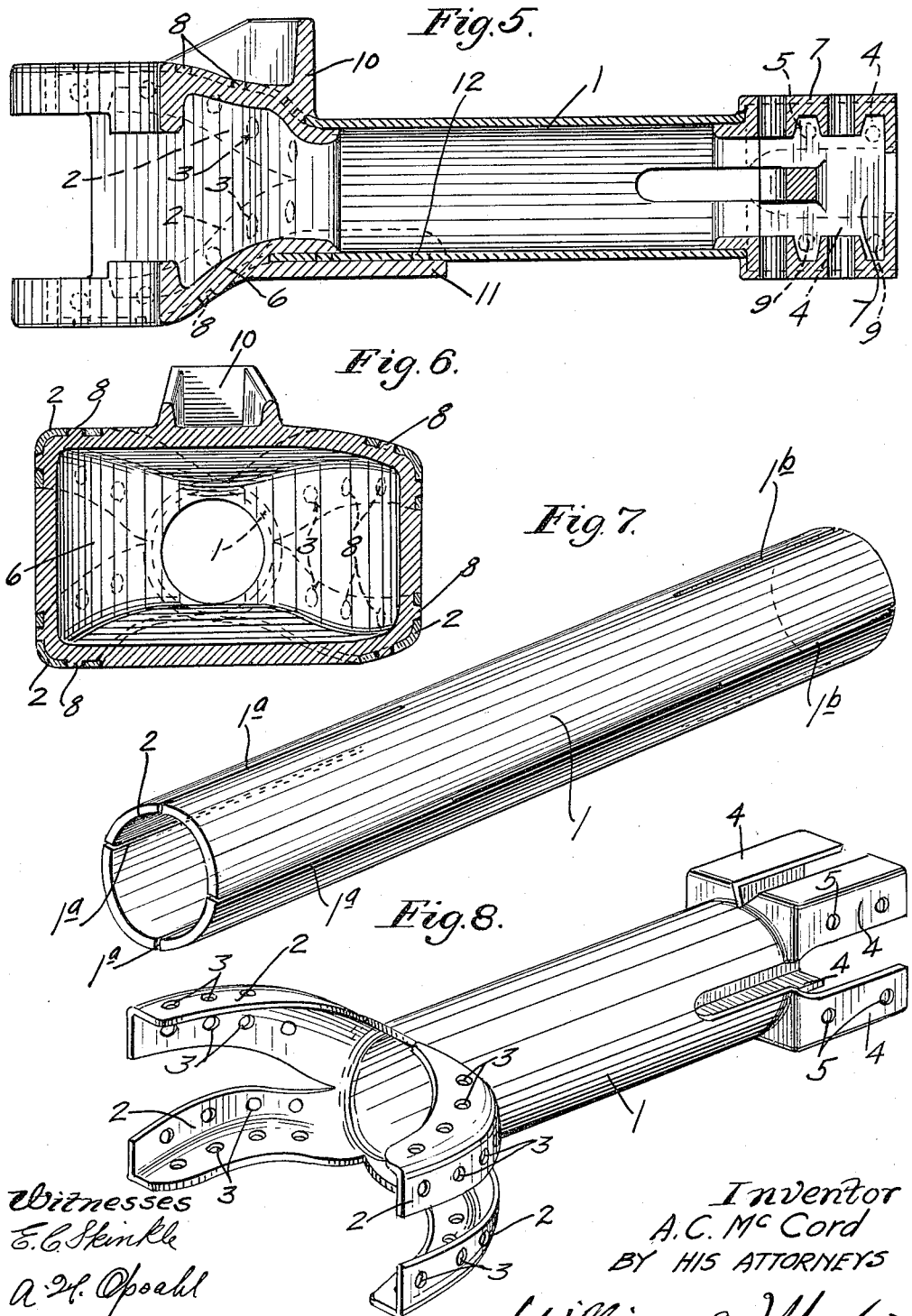

A. C. McCORD.
COUPLING DRAW BAR.
APPLICATION FILED MAR. 5, 1915.

1,165,190.

Patented Dec. 21, 1915.
3 SHEETS—SHEET 3.

Witnesses
E. C. Skinkle
A. H. Opsahl

Inventor
A. C. McCord
BY HIS ATTORNEYS
Williamson & Merchant

UNITED STATES PATENT OFFICE.

ALVIN C. McCORD, OF CHICAGO, ILLINOIS.

COUPLING DRAW-BAR.

1,165,190.  Specification of Letters Patent.  Patented Dec. 21, 1915.

Application filed March 5, 1915. Serial No. 12,346.

*To all whom it may concern:*

Be it known that I, ALVIN C. McCORD, a citizen of the United States, residing at Chicago, in the county of Cook and State of Illinois, have invented certain new and useful Improvements in Coupling Draw-Bars; and I do hereby declare the following to be a full, clear, and exact description of the invention, such as will enable others skilled in the art to which it appertains to make and use the same.

My invention has for its object to provide an improved car coupler draw bar, including coupler head and shank, and involving also an improved process of producing the same.

In accordance with this invention, the coupler shank and a portion of the coupler head are formed out of pressed steel or similar pressed or rolled metal, and the coupler head is completed by a supplemental or additional metallic part that is made fast to the head forming portions of the pressed metal, in the process of forming the coupler.

The supplemental or component parts of the coupler head are put together in layers, so that the coupler head is made a laminated structure. The layers forming the laminated coupler head may be of the same metal, as for example, steel plates, or one or more of the layers may, for example, be pressed steel, and another cast steel. The layers should be fastened together by an intimate union or welding of the layers. When the layers are all of pressed metal, such as pressed steel, they may be welded together by pressure while hot, or may be spot welded after they are pressed together. When one of the layers, for example, is a pressed steel plate, and the other is cast steel, the union between the two may be made by casting the hot molten steel against the pressed steel plate. In all cases, the layers are securely fastened together without the incorporation therewith of any additional parts, other than that of the said layers. The laminated or reinforced construction above described in connection with a coupler head, may also be applied to the back or follower engaging end of the draw bar.

A laminated construction, such as above indicated, and wherein one of the layers is a pressed steel plate and the other a cast steel, may be accomplished by first pressing a steel blank to form the shank and a portion of the head, and then placing the coupler head forming portions thereof, in a mold and casting a steel supplemental head forming part fast thereto, in the process of casting the latter. In some instances, the metal blank may primarily be a flat steel sheet, but in other instances, it may be a pressed or rolled steel tube. This so-called blank, however, may primarily have other original forms than above stated. For example, it might be a rolled channel.

The construction above indicated is well adapted to the manufacture of car couplers of the Master Car-Builders' type. Such a coupler designed in accordance with my invention, may be made much lighter than a standard cast steel coupler of the Master Car-Builders' type, while having as great, or even much greater strength and durability, and furthermore, may be manufactured at less cost.

The invention is illustrated in the accompanying drawings wherein like characters indicate like parts throughout the several views.

Figure 2:
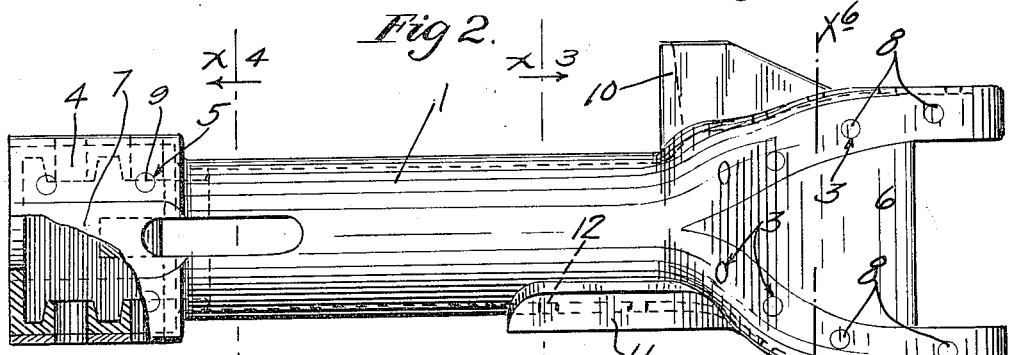
Figure 3:
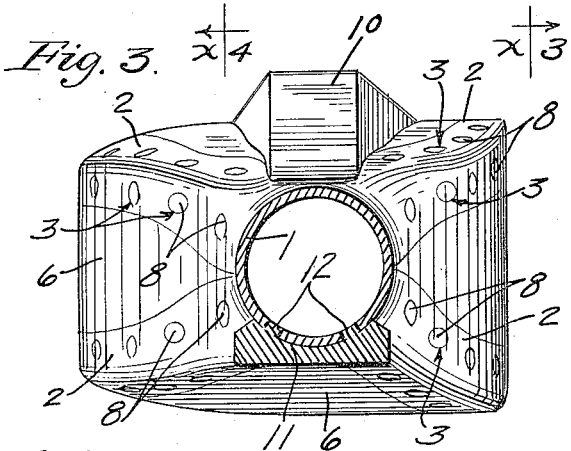
Figure 4:
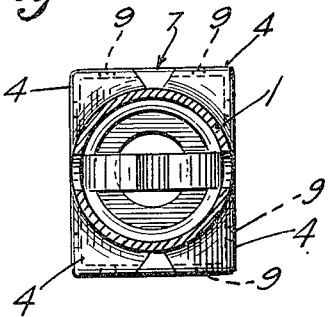
Figure 9:
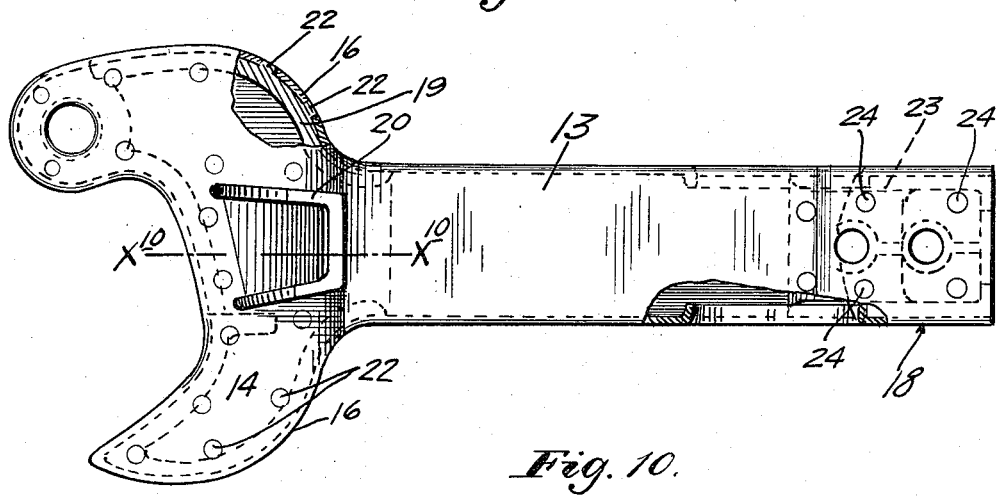
Figure 10:
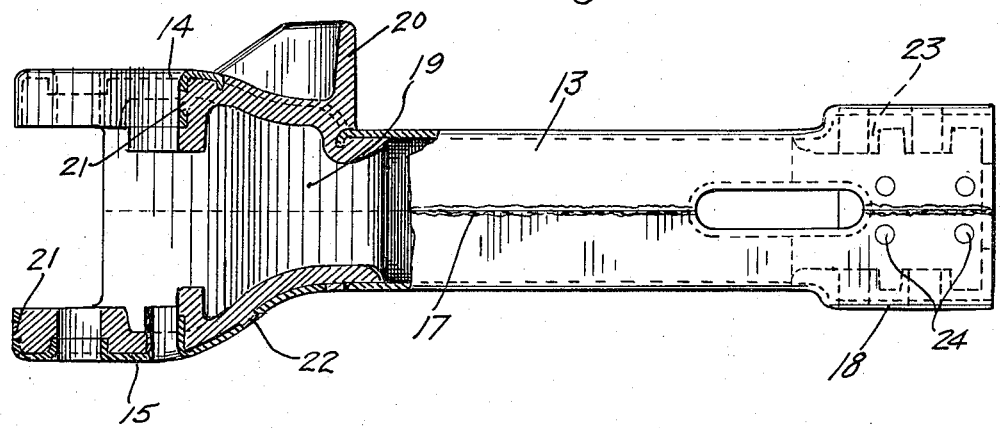

Referring to the drawings: Figure 1 is a plan view with some parts broken away, showing a coupler of the type wherein the shank and a portion of the coupler head are formed from a rolled steel tube, some parts being sectioned; Fig. 2 is a side elevation of the coupler shown in Fig. 1, some parts being broken away and some parts being sectioned; Fig. 3 is a section taken on the line $x^3$ $x^3$ on Fig. 2; Fig. 4 is a section taken on the line $x^4$ $x^4$ on Fig. 2; Fig. 5 is a longitudinal section taken through the coupler on the line $x^5$ $x^5$ on Fig. 1; Fig. 6 is a transverse section taken through the coupler head approximately on the line $x^6$ $x^6$ on Fig. 2; Fig. 7 is a perspective view showing a tubular blank from which the shank and a portion of the coupler head are formed and the ends thereof being slit; Fig. 8 is a perspective view showing one end of a tube bent to form a portion of the coupler head, and the other end bent to form a portion of the enlarged end of the shank; Fig. 9 is a plan view of the coupler, the shank and portions of the coupler head of which are formed from two flat sheets pressed to proper form, some parts being broken away; and Fig. 10 shows the coupler illustrated in Fig. 9, partly in side elevation and partly in section on the line $x^{10}$ $x^{10}$ on Fig. 9.

Referring first to the construction illustrated in Figs. 1 to 8, inclusive, the numeral 1 indicates a steel tube or blank. This tube, at its coupler-head forming end, and preferably also at its other end, is slit longitudinally at four different points ninety degrees apart, the slits at the coupler head forming end being indicated by the numeral 1ª and the slits at the other end of the shank being indicated by the numeral 1ᵇ. The four prongs 2 formed between the slits 1ª, are bent or pressed into curved form, angular in cross section, as shown in Fig. 8, so that they are given approximately the contour of the coupler head.

The webs of these prongs 2 are formed with perforations 3 that are to receive portions of the cast body of the coupler head, and, preferably, they are flared slightly outward, so that the portions cast therein will have an interlocking dove-tail action.

The prongs 4, which are formed between the slits 1ᵇ, are pressed outward and given an angular form in cross section, so that they follow the contour of the enlarged end of the shank, and the webs of these prongs 4 are also preferably provided with perforations 5, which are like the perforations 3 and are provided for a similar purpose.

To complete the coupler, by supplemental steel castings, both of the pronged ends, formed substantially as shown in Fig. 8, are placed in suitable molds, and the cast steel portions of the coupler head and of the enlarged end of the coupler shank are directly cast against the same and made fast thereto, in the process of casting. The cast body portion or shell of the coupler head is indicated by the numeral 6, and the cast body portion of the enlarged end of the coupler shank is indicated by the numeral 7. The casting 6 will have the stud-like portions 8 cast directly into the perforations 3 of the prongs 2, and the casting 7 will have the stud-like portions 9 cast into the perforations 5. The cast metal which thus runs into the perforations interlocks the casting of the rolled steel element, but there will be a further union made by the welding, or partial welding of the pressed steel and cast steel, due to the intense heat of the latter, so that the pressed and cast steel parts become substantially integral.

The cast portion 6 of the coupler head is shown as integrally formed on top with the customary buffer lug 10, and, on its under portion is shown as provided with a rearwardly projecting segmental flange 11 that is cast directly against the bottom of the shank and is united therewith by cast portions 12 run into perforations in the said shank. The coupler is of the Master Car-Builders' type, and hence, its coupler head is formed hollow and provided with the usual lugs for the pivotal connection thereto, of the standard knuckle. The usual or any suitable provision may be made for the application of the lock dog or pin, but, as these particular features constitute no part of the present invention, they are not illustrated.

In the construction illustrated in Figs. 9 and 10, the coupler shank 13, and very considerable portions of the coupler head are made out of a sectional or two-part sheet metal blank, which blank sections are bent to form the coupler shank 13, and the top and bottom and side walls 14, 15 and 16, respectively, of the coupler head. The abutting edges of the two sections of the blank, after being bent to the form indicated, are united by welded joints 17. The ends of the shank forming plates, are shown as bent at 18 to increase the vertical dimension of that end of the shank. The pressed metal shell thus formed is then placed with its end in suitable walls, and the supplemental head forming portion 19 is then cast against the inner surfaces of the pressed steel walls 14, 15 and 16, and part way into the shank 13, and a welded or partly welded joint between these pressed steel and cast steel portions will be formed. The top plate 14 is preferably provided with an opening and the casting 19 formed with an integral buffer lug 20, which projects upward therethrough. The edges of the top and bottom plates 14 and 15 are turned, respectively, downward and upward on lines which follow the front edge of a coupler of the Master Car-Builders' type, and are provided with perforations into which portions 21 of the casing 19 will run in the process of casting, to further insure rigid connection between the pressed steel and cast elements. Also, the bottoms of the said plates 14, 15 and 16 are likewise formed with perforations into which portions 22 of the casting 19 will run for a like purpose. The cast steel body which is cast into the enlarged end of the shank of this form of the coupler, is indicated by the numeral 23 and the stud-like portions thereof, which run into the perforations of the shank are indicated by the numeral 24.

What I claim is:

1. A coupler drawbar having a pressed metal portion and a cast head forming portion cast fast thereto.

2. A coupler drawbar having its shank and a portion of its coupler head formed of pressed steel, the said coupler head being completed by a supplemental body of cast metal cast fast thereto.

3. A coupler drawbar having its shank formed from a metallic tube, said tube having an end split and bent to form four prongs that follow the contour of the coupler head, and a supplemental body of metal cast fast to said prongs and completing the coupler head.

4. A coupler drawbar having its shank formed from pressed steel bent at one end to form a part of the coupler head, and having the pressed steel walls of its ends united with supplemental bodies of metal cast fast thereto.

5. A coupler drawbar having its shank formed from a metallic tube, the said tube having one end split and bent to form prongs that follow the contour of the coupler head, and a supplemental body of metal cast fast to said prongs and completing the coupler head.

6. A coupler drawbar comprising a metallic body and an independently-formed metallic head portion made fast to said body in the forming of said head portion.

In testimony whereof I affix my signature in presence of two witnesses.

ALVIN C. McCORD.

Witnesses:
C. J. COPELAND,
C. W. RUDOLPH.